United States Patent [19]  [11] 4,137,643
Carmel  [45] Feb. 6, 1979

[54] GAUGING ASSEMBLY
[75] Inventor: Edwin L. Carmel, Cincinnati, Ohio
[73] Assignee: American Standard Inc., New York, N.Y.
[21] Appl. No.: 820,673
[22] Filed: Aug. 1, 1977
[51] Int. Cl.² .......................... G01B 5/02; G01B 3/30
[52] U.S. Cl. ................................. 33/180 R; 33/1 D; 33/169 R; 33/185 R
[58] Field of Search .................... 33/1 D, 165, 168 R, 33/168 B, 169 R, 174 H, 174 TB, 180 R, 181 R, 185 R; 72/461

[56] References Cited
U.S. PATENT DOCUMENTS

| 721,800 | 3/1903 | Heatly | 33/169 R |
|---|---|---|---|
| 1,213,134 | 1/1917 | Fellows | 33/168 R |
| 1,436,181 | 11/1922 | Locke | 33/143 J |
| 2,853,570 | 9/1958 | Garno | 33/168 R |
| 2,921,377 | 1/1960 | Hohl | 33/185 R |
| 3,452,441 | 7/1969 | Baker | 33/181 |
| 3,867,763 | 2/1975 | Wilkins | 33/185 R |

Primary Examiner—Richard R. Stearns
Attorney, Agent, or Firm—James J. Salerno, Jr.; Robert G. Crooks

[57] ABSTRACT

A gauging assembly adapted for use in positioning stock material with respect to fixed equipment. The assembly includes an elongated retainer having a predetermined arrangement of stop positions thereon. An elongated holder is provided for slidable coupling with the retainer and permitting reciprocal relative longitudinal movement therebetween. At least one stop block is provided and has a plurality of material engaging faces. The block is rotatable to expose each face in sequence for engagement with stock material. A connector is used for removably positioning the stop block at a desired stop position to prevent rotation of the stop block and permitting displacement and rotation of the stop block and shifting of the block to the other stop positions. Indicia indicates the relative horizontal position of the retainer with respect to the holder, the stop block with respect to the retainer and the exposed face of the stop block. A fastener removably couples the holder and retainer in a plurality of longitudinal positions. The assembly is adapted to be mounted to the fixed equipment so that shifting of the stop block between stop positions, relative sliding movement of the retainer with respect to the holder and rotation of the gauge block provides a variety of longitudinal adjustments for the positioning of the material engaging face of the stop block and accordingly determining the position of the stock material with respect to the fixed equipment.

13 Claims, 16 Drawing Figures

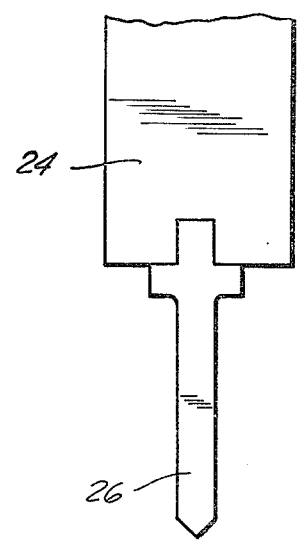
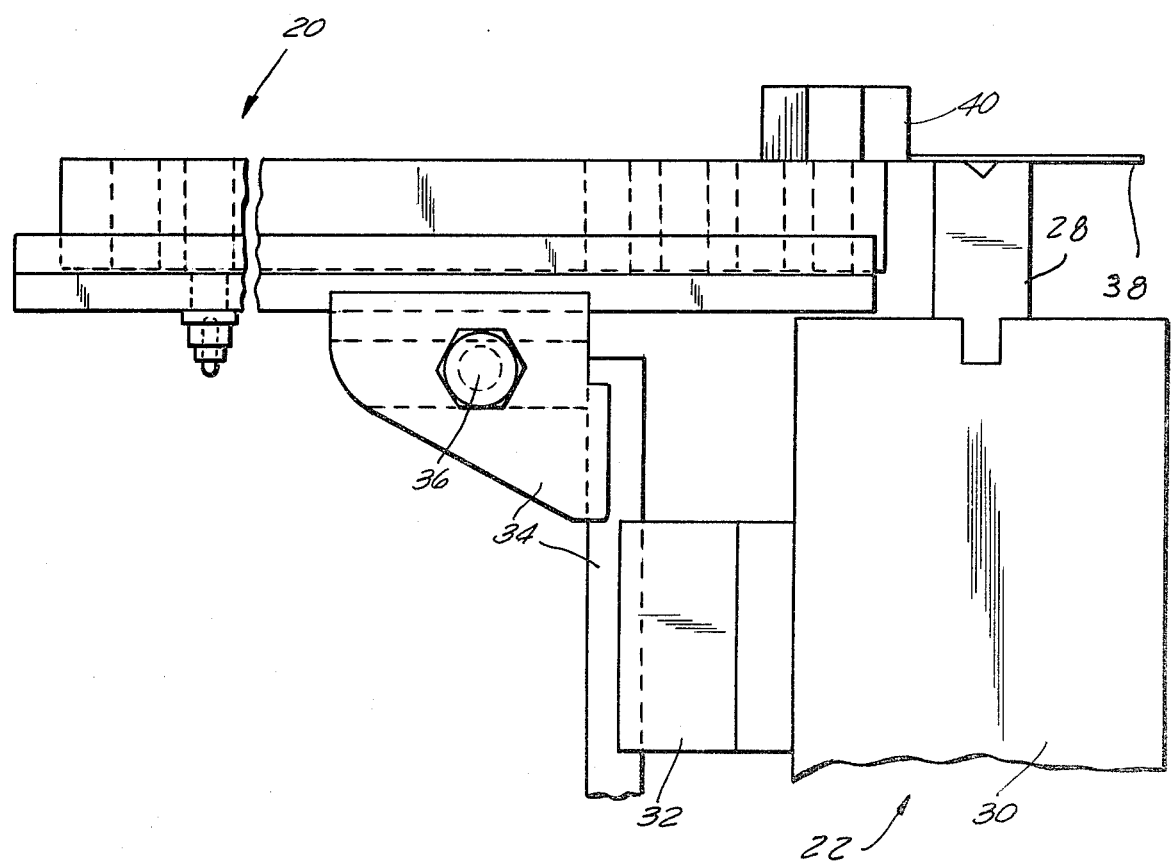
FIG. 1

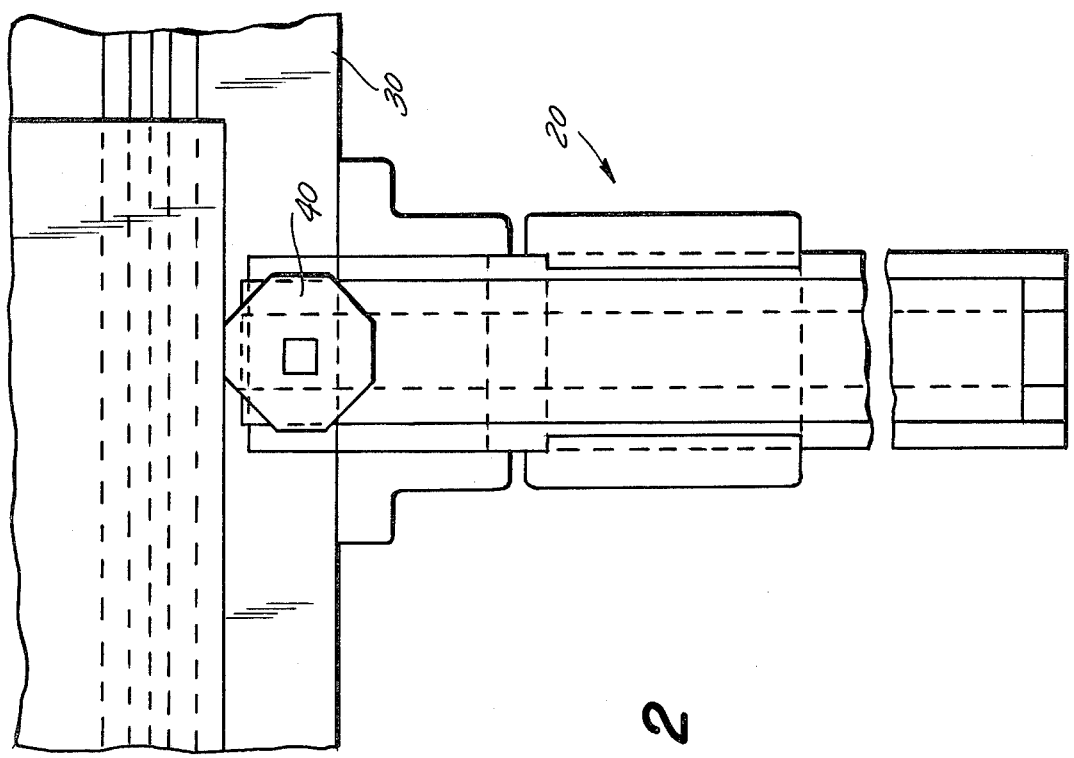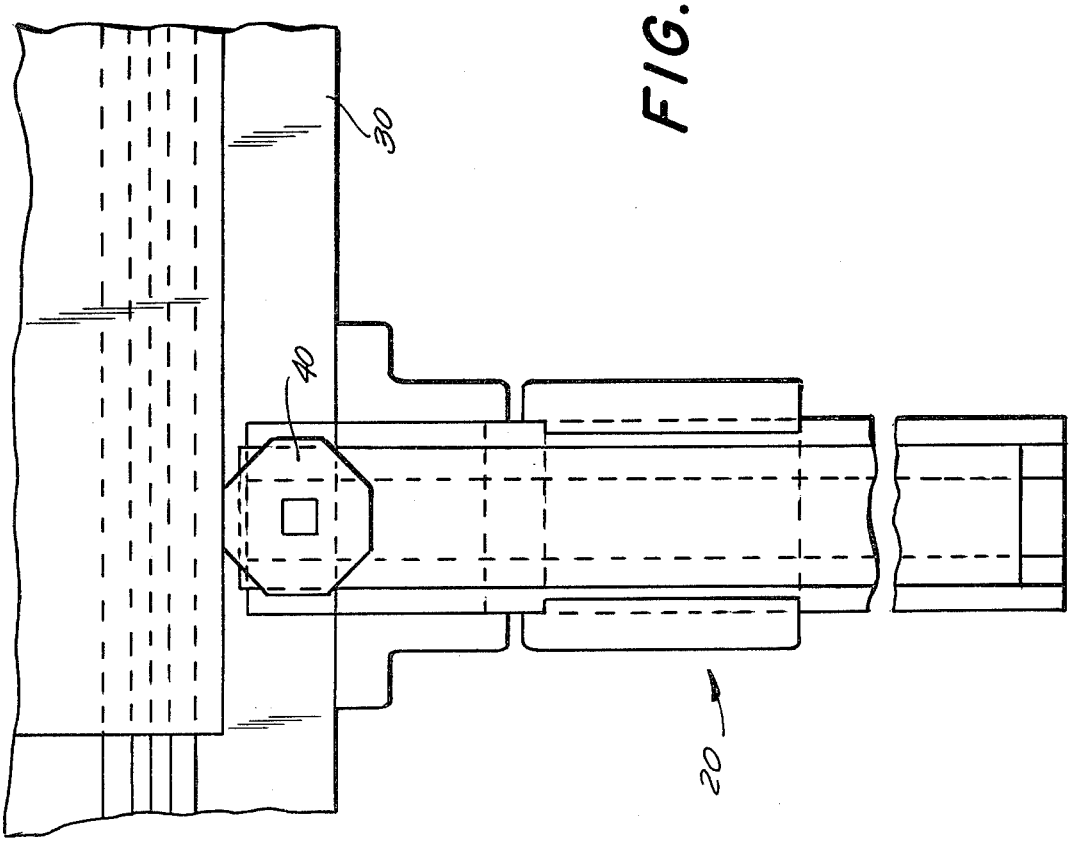
FIG. 2

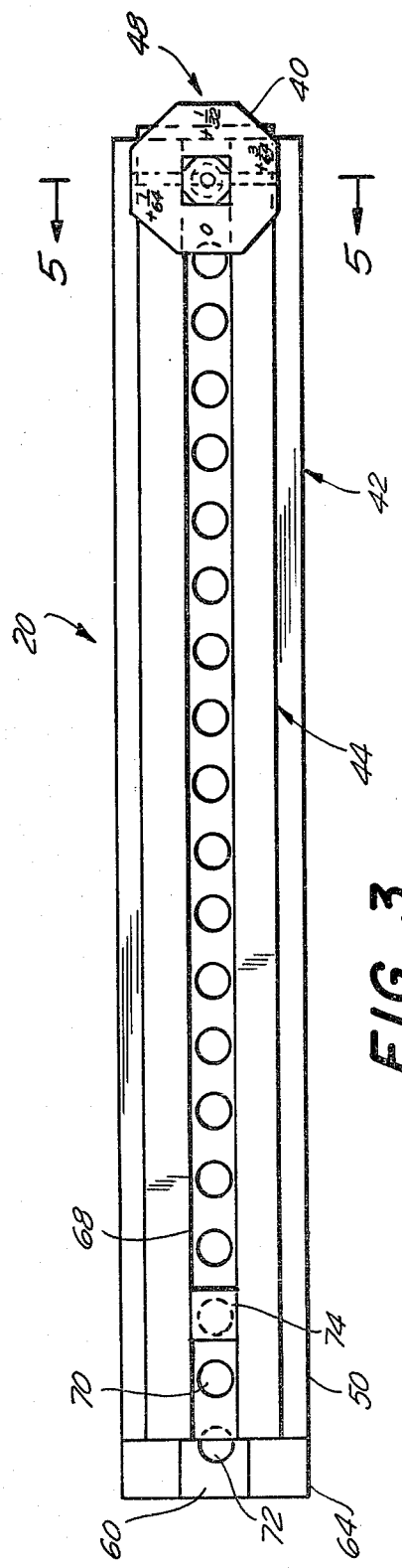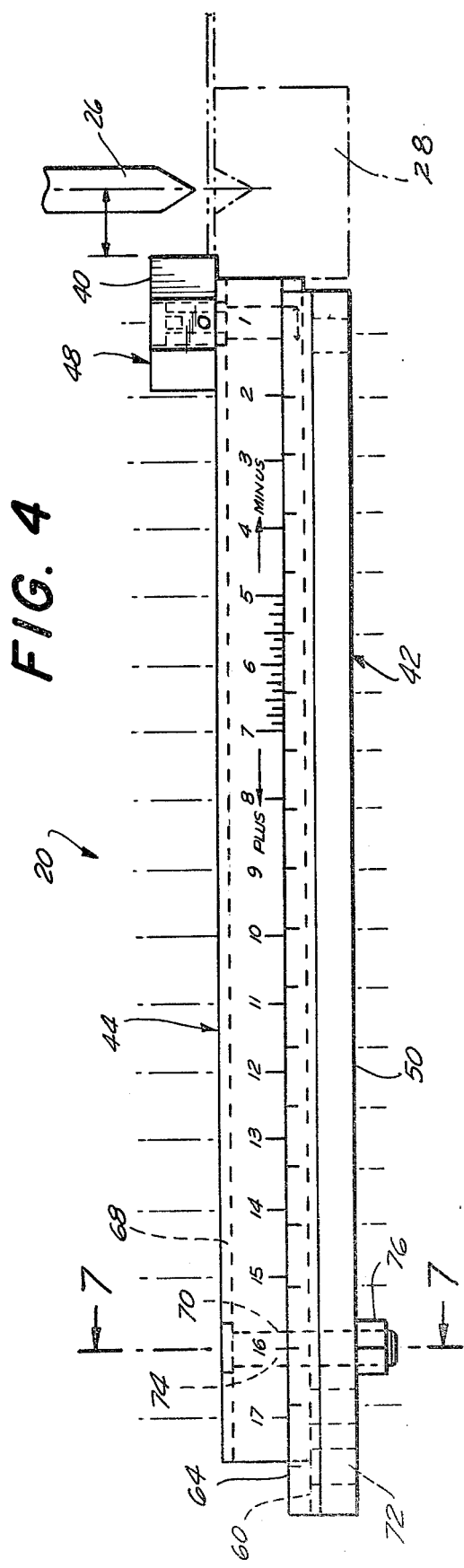

FIG. 5
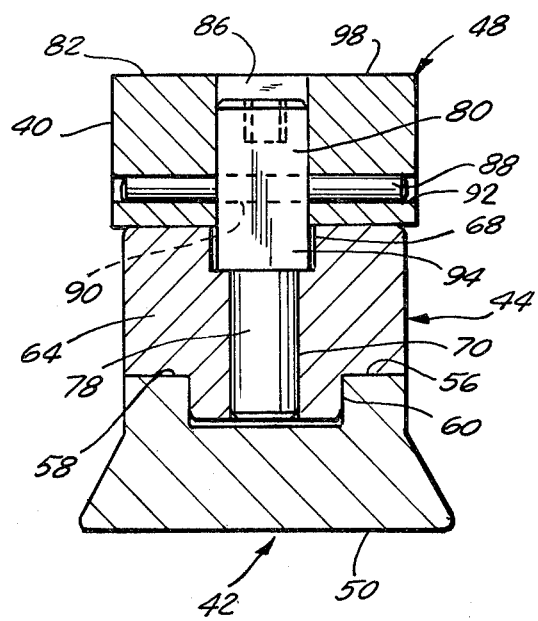
FIG. 6
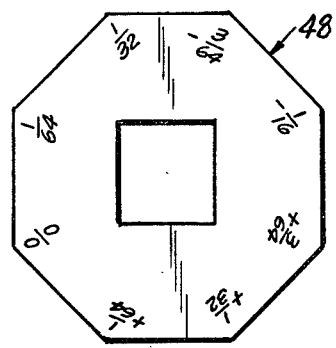
FIG. 7
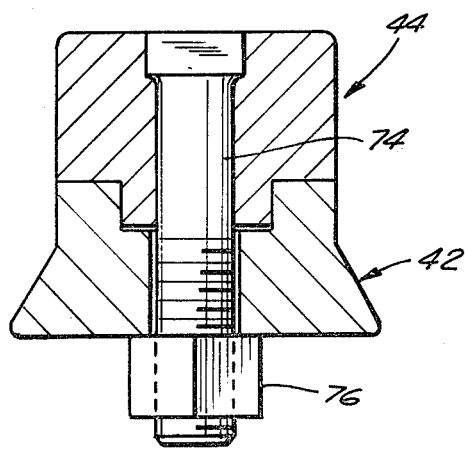
FIG. 8

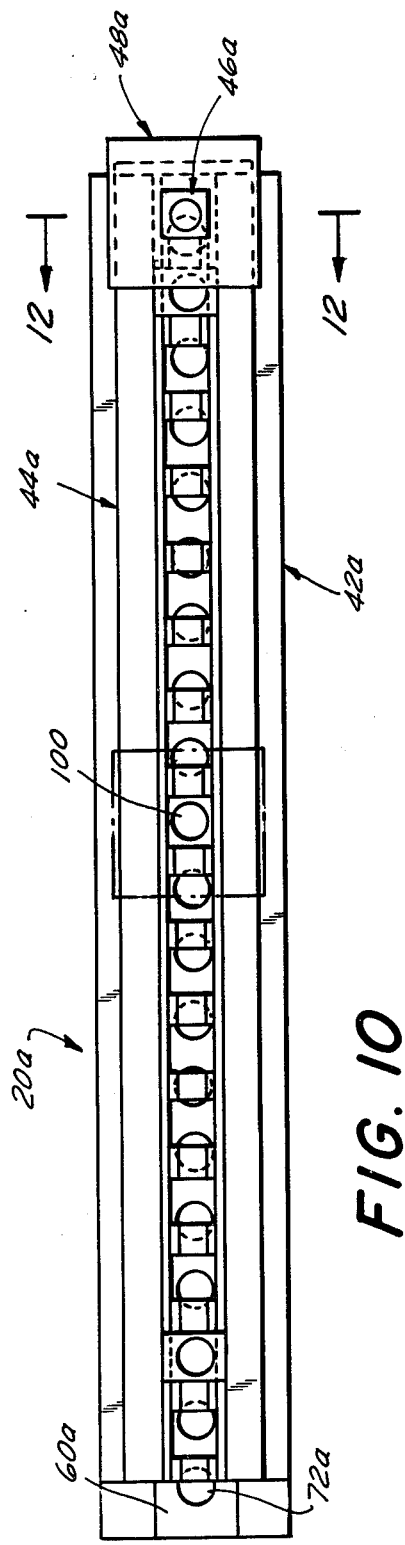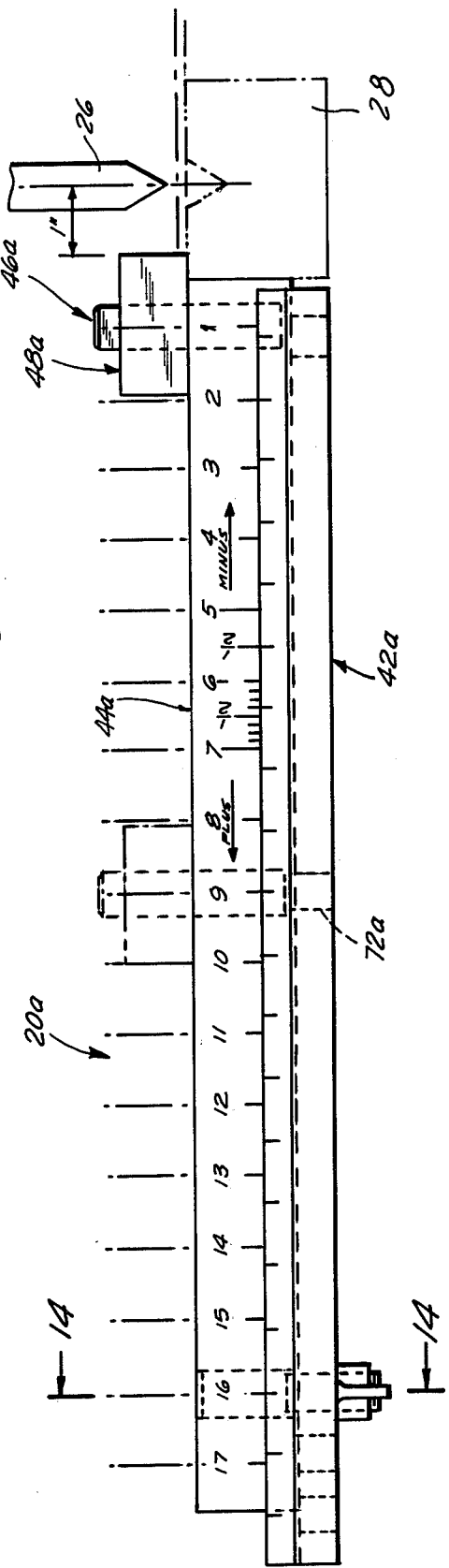
FIG. 10
FIG. 11

GAUGING ASSEMBLY

BACKGROUND OF THE INVENTION

In manufacturing procedures, it is often necessary to quickly and accurately index a work piece onto fixed equipment. The fixed equipment can be any of a variety of different common types of machinery such as a press brake or a punch press. Similarly, the work piece can be any of a variety of different structures including metal sheet material and the like.

Quite often different size work pieces are employed and it is necessary to readjust the machine to account for changes in dimension of the work piece. This can be a time consuming and difficult procedure which adds to manufacturing costs. The machine is often shut down and out of service for an undesirable length of time while the adjustment is being accomplished. In manufacturing procedures, it is desirable to provide for adjustment of the machinery as quickly and efficiently as possible.

Adjustment usually entails the use of an adjustable gauging mechanism as part of the machine or as an attachment. The object is to shift the engagement surface for the work piece when placed on the machine. Accordingly, there is a need for an accurate and versatile gauging assembly to permit rapid and efficient adjustment of a piece of equipment to receive stock material or work pieces of different dimensions. Naturally the gauging assembly should be of low cost, simple to operate, and usable with many different types of fixed equipment.

SUMMARY OF THE INVENTION

With the above background in mind, it is among the primary objectives of the present invention to provide a gauging assembly which is adapted to be inexpensively manufactured, can be easily mounted to a variety of different types of machinery and can be used to adjust the receiving surface for a piece of stock material by providing a plurality of different types and ranges of adjustments as part of the gauging assembly. The assembly is designed so that one or more of three different scales of adjustments can be quickly and efficiently carried out with respect to a given engaging surface for the work piece. It is contemplated that the gauging assembly of the present invention can employ any or all of the three types of adjustments equally well depending upon the desired requirements for the gauging assembly.

It is an objective to provide a gauging assembly with a fine adjustment in the form of a rotating gauge block with a plurality of faces. Each face of the block is a different dimensional distance from the axial center of the block so that rotation to reorient the faces changes the distance between the center of the block and the edge in a given direction thereby providing for a quick and efficient fine adjustment. A retainer is provided to hold the rotatable stop block at all of the fine adjustment positions with the block being easily displaced and rotated to a further position and then reengaged with the retainer to be held in that position.

It is a further objective to provide a second adjustment arrangement whereby the gauge block is adapted to be shifted longitudinally along a row of receiving recesses in the retainer thereby permitting a larger degree of adjustment along the length of the retaining structure with respect to a given face of the rotatable block. For this purpose, a connector extends from the block and can be positioned in the receiving apertures along the length of the retainer.

It is a further objective to provide a retaining structure of two slidably interengaged members, one being a retainer to hold the gauge block and the other being a holder which is adapted to be mounted to the fixed equipment. A suitable releasable fastener holds the slidable retaining structure members in a fixed position relative to one another and when released permits the longitudinal adjustments therebetween thereby providing a third adjustment means for the gauge assembly with respect to a given receiving face on the stop block.

It is an objective to provide appropriate indicia on the retaining structure and the stop block to indicate the various adjustment positions.

A further objective is to provide an assembly whereby interchangeable stop blocks can be employed with the retaining structure to provide for additional fine adjustment settings. For further control, two or more gauging assemblies can be mounted in aligned positions to receive the work piece on the fixed equipment.

In summary, a gauging assembly is provided which is adapted for use in positioning stock material with respect to fixed equipment. The assembly includes an elongated retainer having a predetermined arrangement of stop positions thereon. At least one stop block is provided and has a plurality of material engaging faces. The block is rotatable to expose each face in sequence for engagement with stock material. A connector is used for removably positioning the stop block at a desired stop position to prevent rotation of the stop block and permitting displacement and rotation of the stop block. Indexing means is provided for indicating the exposed face of the stop block. Mounting means is on the retainer to mount the assembly to the fixed equipment so that rotation of the stop block provides a variety of longitudinal adjustments for the positioning of the material engaging face of the stop block and accordingly determining the position of stock material with respect to the fixed equipment.

Additionally, a plurality of stop positions are present on the retainer so that the stop block can be shifted to the other stop positions and the indexing means also indicates the position of the stop block with respect to the length of the retainer thereby providing a further adjustment means.

Furthermore, an elongated holder is provided with means thereon for slidably coupling the holder to the retainer and permitting reciprocal relative longitudinal movement therebetween. The indexing means also indicates the relative longitudinal position of the retainer with respect to the holder. A releasable fastener is provided to couple and uncouple the holder and retainer at a variety of different longitudinal adjustment positions thereby providing additional adjustments for positioning of the material engaging surface of the stop block and accordingly determining the position of the stock material with respect to the fixed equipment.

With the above objectives among others in mind, reference is made to the attached drawings.

BRIEF DESCRIPTION OF THE DRAWINGS

In the drawings:

FIG. 1 is a fragmentary elevation view of the gauging assembly of the invention mounted on fixed equipment;

FIG. 2 is a fragmentary top plan view thereof showing two gauging assemblies of the invention mounted on the fixed equipment;

FIG. 3 is a top plan view of the gauging assembly of the invention;

FIG. 4 is a side elevation view thereof and showing the gauging assembly in position to engage a work piece and position the work piece with respect to fixed equipment;

FIG. 5 is an end sectional view of the gauging assembly taken along the plane of line 5—5 of FIG. 3;

FIG. 6 is a top plan view of a stop block portion of the assembly;

FIG. 7 is a sectional end view of the gauging assembly taken along the plane of line 7—7 of FIG. 4;

FIG. 8 is a top plan view of an alternate stop block portion of the gauging assembly of the invention;

FIG. 10 is a top plan view of an alternative embodiment of the gauging assembly of the invention;

FIG. 11 is a side elevation view thereof showing the gauging assembly in position to hold a work piece in alignment with fixed equipment;

DETAILED DESCRIPTION

Figure 9:
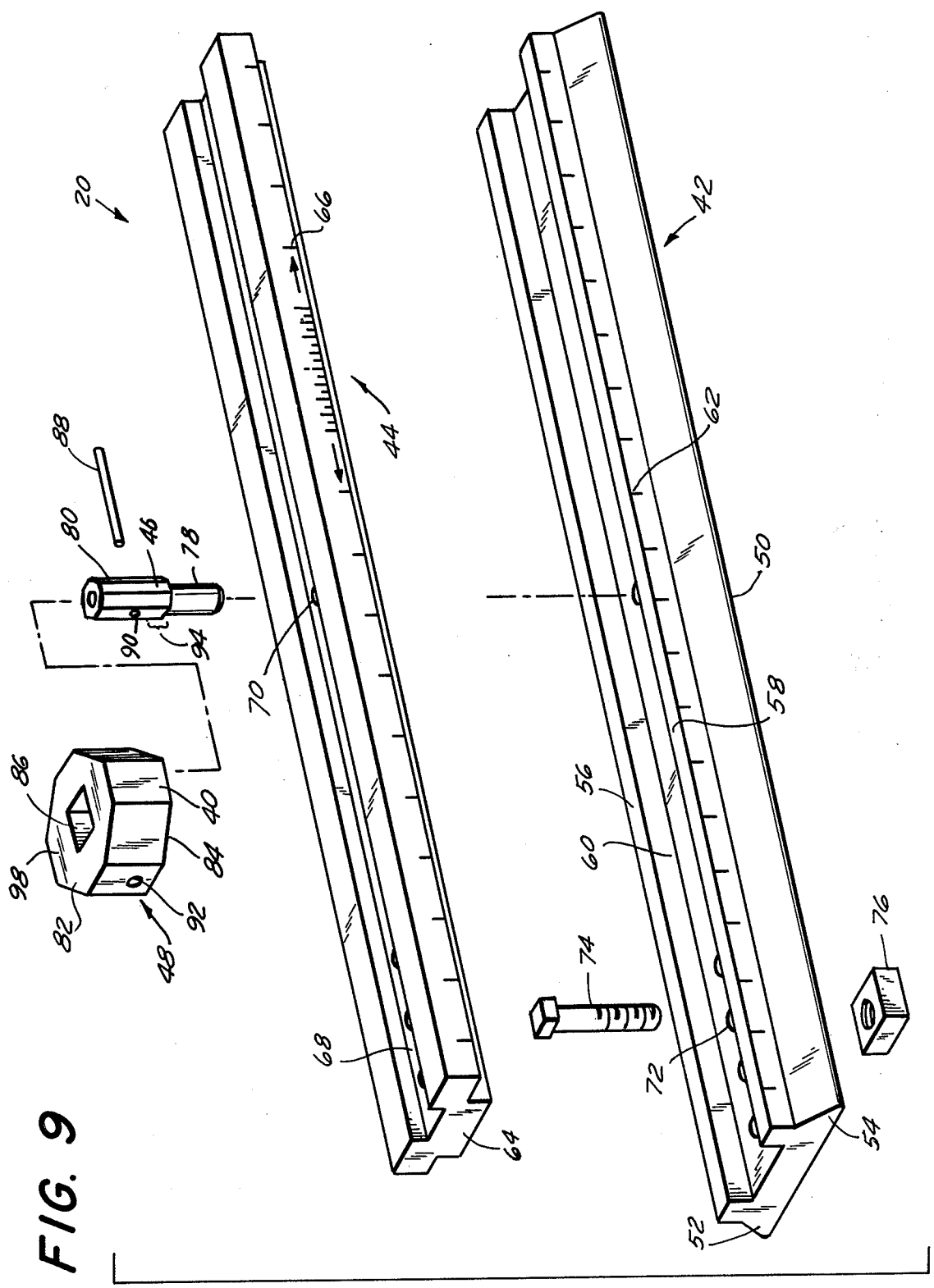
FIG. 9 is an exploded perspective view of the gauging assembly of the invention.
Figure 12:
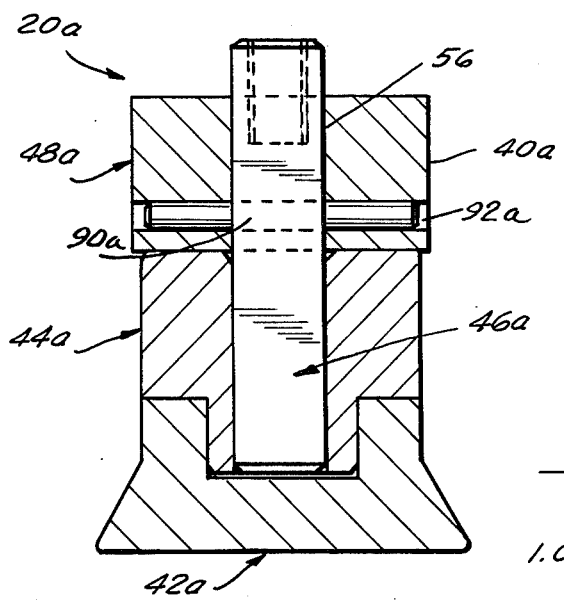
FIG. 12 is a sectional end view thereof taken along the plane of line 12—12 of FIG. 10.
Figure 13:
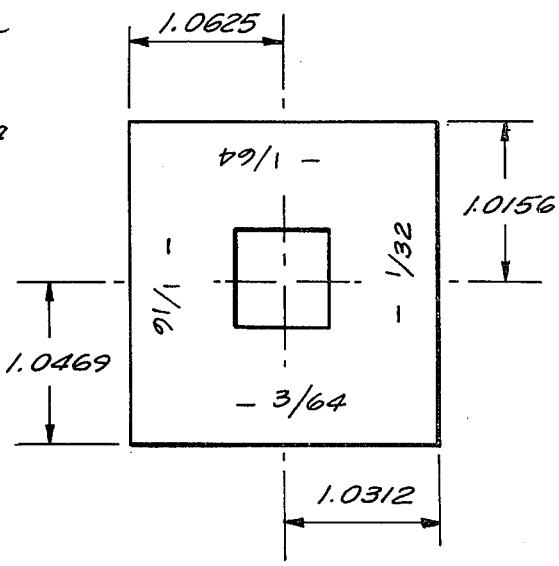
FIG. 13 is a top plan view of a stop block portion of the alternate embodiment.
Figure 14:
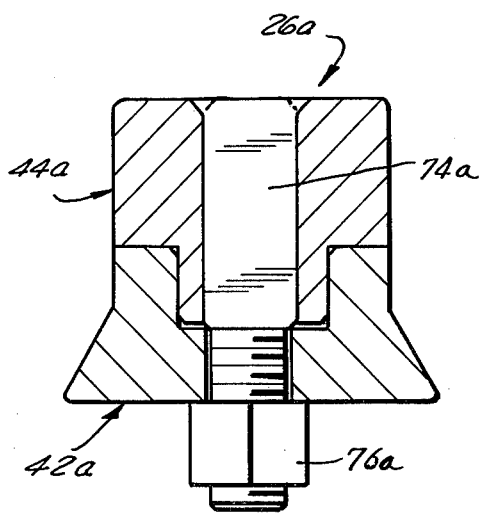
FIG. 14 is a sectional end view of the alternate embodiment taken along the plane of line 14—14 of FIG. 11.

As shown in FIGS. 1 and 2, gauging assembly 20 of the invention is adapted for use with conventional type of machinery. In the depicted form, two assemblies 20 are mounted to a conventional press brake 22. The press brake is of the type which employs a machine ram 24 in an overhead position with a punch 26 extending therefrom. In vertical alignment with punch 26 is a die 28 seated on machine bed 30. For each gauging assembly 20, an attaching clamp block 32 extends from the machine bed and has a gauge clamp assembly 34 mounted thereon. By means of a suitable bolt assembly 36 the clamp 34 engages with gauging assembly 20 to hold it in fixed position with respect to the fixed machinery 22. A work piece 38 can then be inserted into the machine until it engages with face surface 40 on gauging assembly 20 where it will be in proper position for the machine to operate thereon.

The details of each gauging assembly 20 are depcited in FIGS. 3-9. Assembly 20 includes a holder 42, retainer 44, a polygonal connector 46 and a stop block 48. Holder 42 has a flat undersurface 50 and a dovetail configuration with a pair of opposing wings 52 and 54 which provide engaging surfaces for the gauge clamp 36 to mount the holder to the fixed machinery.

The upper surface of holder 42 has a pair of spaced upstanding longitudinal walls 56 and 58 with a longitudinal recess 60 therebetween. Along the exposed outer surface of wall 58, and if desired wall 56, is a longitudinal arrangement of indicia 62 for linear measurement.

Recess 60 is open at both ends to permit the slidable positioning of retainer 44 therein. The retainer has a narrow lower portion 64 which is configured to key with the surfaces forming recess 60. The undersurface of the upper portion of the retainer rests on the upper surfaces of walls 56 and 58. The exposed outer surface of the upper portion of retainer 44 has appropriate indicia 66 corresponding to indicia 62 on holder 42. A linear dimension can be determined in accordance with the relative position of the retainer with respect to the holder in a longitudinal direction. An elongated longitudinal slot 68 is formed in the upper surface of retainer 44 and a longitudinal row of holes 70 are formed in the base of the slot. The holes 70 are arranged to correspond with a set of holes 72 in the base of recess 60 of holder 42. When a hole 70 and a hole 72 are in alignment, a retaining bolt 74 is inserted therethrough and an appropriate fastener, such as nut 76, applied to retain the holder and retainer in fixed relative longitudinal position. Removal of nut 76 and bolt 74 from the aligned holes will permit sliding movement of the retainer with respect to the holder until a further longitudinal position is attained at which time the bolt 74 can be again inserted through a pair of aligned holes 70 and 72 and nut 76 applied to the bolt to retain the holder and retainer in the new fixed position. This is one way in which the gauging assembly 20 permits linear adjustment for locating a work piece with respect to fixed machinery 22. Naturally, any of a number of different types of common fasteners can be used in place of the nut and bolt assembly.

Further adjustments are achieved through the use of the cooperating relationship between polygonal connector 46 and stop block 48. Connector 46 has a narrower diameter lower portion 78 having a circular outer configuration and dimensioned so that it is insertable into holes 70. The upper portion 80 of connector 46 is of larger diameter and has a polygonal outer configuration with eight faces to form an octagon.

Stop block 48 has a flat upper surface 82 and a flat undersurface 84. A square central passageway 86 extends through the stop block 48. The stop block has an octagonal configuration so that it is formed with eight side faces 40. Each side face 40 is a different distance from the axial center of the stop block thus providing a different adjustment position for the block as it is rotated with respect to the measuring position. The faces 40 of the stop block form the engaging surfaces for the work piece.

Stop block 48 is mounted to connector 46 by passing polygonal upper portion 80 into square aperture 48 and holding the connector in position by means of a set screw 88 threaded through aligned apertures 90 and 92 in the connector 46 and stop block 48 respectively. Each side of the polygon connector portion corresponds to a face 40 on the block 48 and is aligned therewith.

The height of polygonal upper portion 80 of connector 46 is greater than the height of stop block 48 so that a portion 94 of connector 46 adjacent to narrow diameter lower portion 78 extends below block 48. Thus, when the interconnected block and connector is inserted into retainer 44 with narrow diameter portion 78 extending into a hole 70, exposed portion 94 of upper polygonal portion 80 will engage with the side walls of slot 68 and prevent rotation of the connector and stop block with respect to the retainer 44. The choice of sides of the polygonal connector in engagement with the side walls of the slot 68 determines which face 40 is in the engagement position for the work piece. The choice of a hole 70 along the length of retainer 44 provides a linear adjustment means in addition to the relative shifting of the retainer and holder as described above. This is a further type of adjustment with adjustments in this respect being permitted by merely lifting stop block connector 46 out of a hole 70 and shifting it to another hole 70 along the length of the retainer. Appropriate indicia indicates the location of each hole 70 on a linear measurement basis. Portion 78 is shorter than the portion of retainer 44 between the base of recess 68 and the undersurface of the retainer thereby housing portion 78 entirely within the retainer and not permitting its interference with the sliding relationship between the undersurface of the retainer and the base of recess 60 in holder 42.

A third finer adjustment is achieved by the ability to rotate block 48 along with connector 46 to align a different face 40 with the end of retainer 44 where the work piece is to be introduced. By having different dimensional distances between the axial center of the stop block and each of the faces, each face provides a different dimensional distance and accordingly a fine adjustment means in addition to the previously two discussed adjustment means. Appropriate indicia 98 can be applied to the upper surface 82 of stop block 48 in alignment with each face 40 to indicate the dimensional change achieved by each face.

Naturally the number of faces 40 on stop block 48 is a matter of choice with eight being the chosen number for the depicted form in FIGS. 1-9. Polygonal upper portion 80 of connector 46 also has eight faces corresponding with the eight faces on the stop block to provide for alignment therebetween so that as the connector is rotated to each of the eight positions where it is retained by engagement between exposed portion 94 and the side walls of slot 68, the appropriate face 40 on the stop block 48 will be in proper alignment with the end wall of the retainer for aligned engagement with the work piece 38 as depicted in FIGS. 1 and 2. For additional control and accuracy of alignment, two similar gauging assemblies 20 can be employed as depicted in FIG. 2 to provide two engagement faces 40 spaced from one another along the length of the machine. Adjustment can be accomplished without the necessity of removing the gauging assembly 20 from the machine or attempting to change the dimensions of the fixed machine 22. Linear adjustments can be made by removing bolt 74 and shifting retainer 44 with respect to holder 42, by lifting block 48 and connector 46 from a hole 70 and shifting it to a further hole 70 along the length of the retainer, or by displacing the block and connector from a hole 70 sufficiently to free exposed portion 94 from the side walls of slot 68 whereupon the block can be rotated to a different position exposing a different face 40 to the end of the retainer.

Each face of the stop block is parallel to a side of the regular polygonal upper portion 80 of the connector but is a different dimension from the center of the connector which also forms the center of the connector and stop block assembly. Adjustments are achieved by turning the stop block so that a different face may be used to locate a work piece on the equipment. Since each face 40 is a different and known dimension from the center line of the stop block, a different position of adjustment is achieved for each face of the stop block thereby permitting very fine adjustments to be achieved such as in 1/64" increments.

Holes 70 in retainer 44 are evenly spaced along the longitudinal row. For example, ¼" diameter holes spaced on 1" centers has been found to be acceptable. In a corresponding fashion, holder 42 is provided with evenly spaced circular holes 72 on a slightly different spacing. For example, they can be ¼" holes spaced on ⅞" centers. In this fashion, for each increment of adjustment, in this case ⅛", a different set of holes 70 and 72 in the retainer and holder line up and their position is maintained by inserting bolt 74 through two of the holes that line up.

The third adjustment is achieved by merely shifting the block and connector to a different hole 70 spaced, for example, on 1" centers.

An example of a different polygonal configuration for the stop block is depicted in FIG. 8 where a ten-sided polygon is provided. The block contains a square passageway through its center and is adapted for use with a corresponding polygonal connector with ten sides in place of connector 46. The ten sided type of block of FIG. 8 is particularly adaptable for metric dimensions. In that case, each face can provide an adjustment of 0.010 of the spacing in the gauge block retainer.

The hole spacing in the dovetail holder for metric measurement would be changed to 0.9 of the hole spacing in gauge block retainer 44. These modifications are all that is required to adjust to the metric system. Naturally appropriate indicia changes can be provided on the retainer, the holder and the ten-sided stop block.

Figure 15:
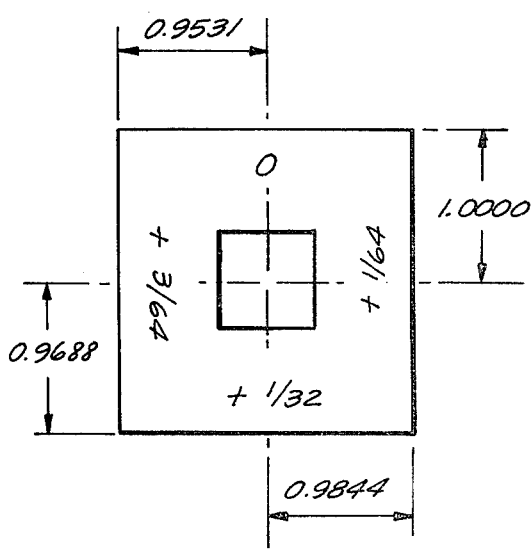
FIG. 15 is a top plan view of a stop block portion of the invention interchangeable with the stop block of FIG. 13 and having different exterior dimensions.
Figure 16:
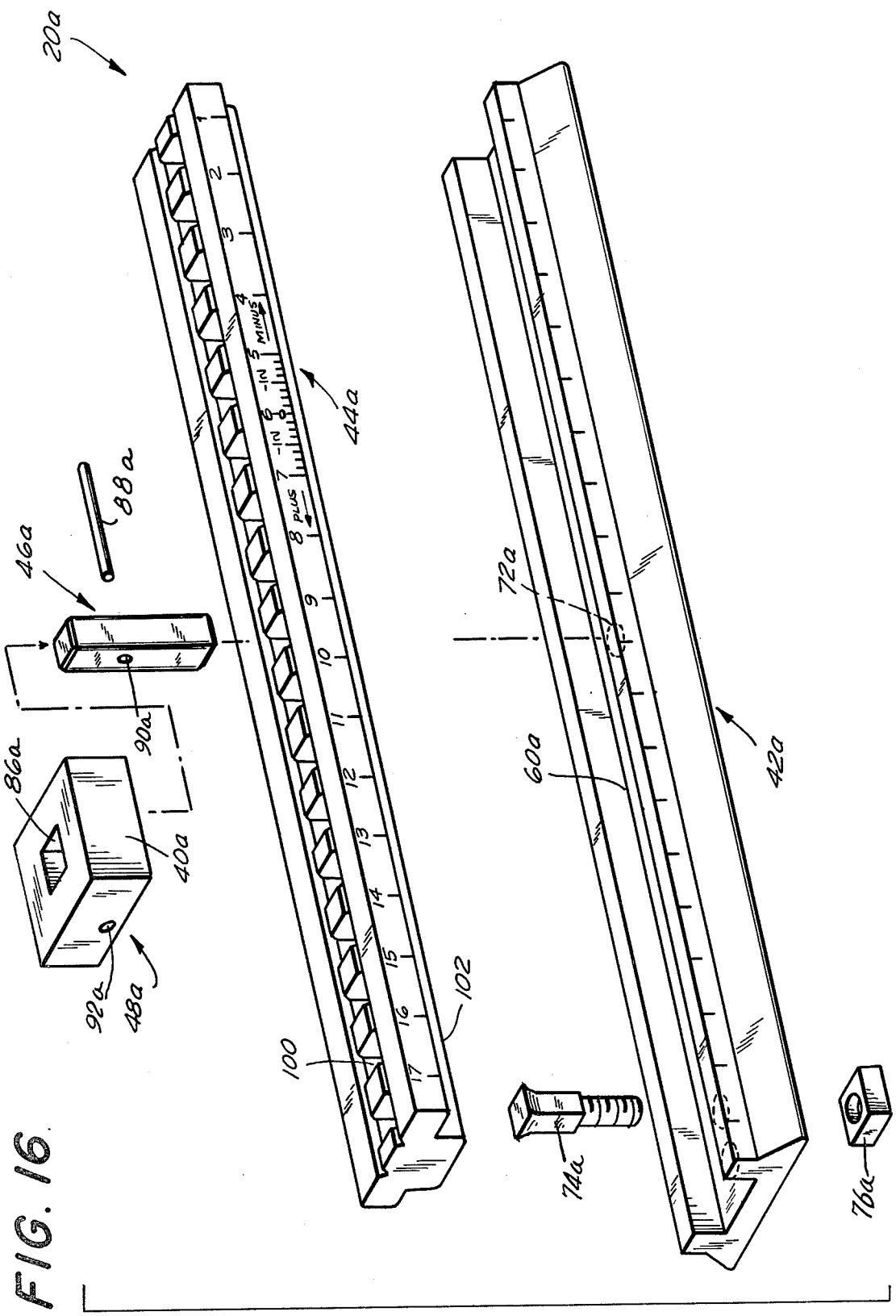
FIG. 16 is an exploded perspective view of the alternate embodiment of the gauging assembly of the invention.

An alternative embodiment is depicted in FIGS. 10-16. Similar components are provided with the same numerals as in the first discussed embodiment with the addition of the subscript a. Gauging assembly 20a is depicted in exploded form in FIG. 16. Holder 42a has the same configuration as holder 42. Retainer 44a slidably engages with holder 42a in the same manner as described above in connection with the first embodiment. The difference in structure resides in the provision of square shaped recesses 100 positioned along the length of the upper surface of retainer 44a. Each recess 100 is in alignment with a square aperture 102 through the remainder of retainer 44a. The row of square apertures 102 is designed for alignment and use with round holes 72a in holder 42 in the same manner as holes 70 and 72 of the first embodiment. The square recesses 100 and the square holes 102 are adapted for use with a different shaped connector 46a and stop block 48a. Connector 46a has a square polygonal outer configuration and is dimensioned so that it is insertable into any of the recesses 100 and holes 102. Stop block 48a has a rectangular configuration on its outer surface for forming four faces 40a for engagement with the work piece 38. A square central aperture 86a is dimensioned to receive the upper portion of square connector 46a therein. A set screw 88a threadedly engages with surfaces forming lateral openings 90a and 92a in connector 46a and block 48a respectively. The sides on the connector pin 46a are aligned and are parallel with the faces 40a on the stop block. Once square connector 46a is inserted into a recess 100 it will be prevented from rotation by the square configuration of the recess and the outer surface of the connector. A portion of the connector 46a is housed within square aperture 86 of block 48 and the remainder extends from the undersurface thereof. Adjustments are achieved in the same three ways as previously discussed with the gauge block and connector being shiftable from opening 100 to opening 100 for one type of adjustment and being displaceable and rotatable to expose different faces 48 for fine adjustments. Removal of retaining bolt 74a and nut 76a will permit the longitudinal adjustment of retainer 44a with respect to holder 42a thus providing a further type of adjustment. Gauge block 48a is designed to be interchangeable with a variety of different size gauge blocks. For example, a different dimension gauge block, as depicted in FIG. 15, can be substituted for the gauge block 48a depicted in FIG. 13. The only difference in structure is a different dimensional distance between the faces 40a and the central axis of the block so as to provide a greater variety of fine adjustment position.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A gauging assembly adapted for use in positioning stock material with respect to fixed equipment comprising:

an elongated retainer having at least one stop position thereon;

at least one stop block having a plurality of material engaging faces and being positionable to expose each face in sequence for engagement with stock material;

a connector for removably positioning the stop block at the stop position on the retainer to prevent rotation of the stop block and permitting displacement laterally away from said retainer to a position permitting rotation of the stop block with respect to said stop position to expose successive faces;

indicia means for indicating the position of the exposed face of the stop block;

mounting and retaining means adapted to mount the retainer to the fixed equipment so that rotation of the stop block provides a variety of longitudinal adjustments for the positioning of the material engaging face of the stop block and accordingly determining the position of the stock material with respect to the fixed equipment.

2. A gauging assembly adapted for use in positioning stock material with respect to fixed equipment comprising:

an elongated retainer having a predetermined arrangement of stop positions thereon;

at least one stop block having a plurality of material engaging faces and being positionable to expose each face in sequence for engagement with stock material;

a connector for removably positioning the stop block at the stop position on the retainer to prevent rotation of the stop block and permitting displacement laterally away from said retainer to a position permitting rotation of the stop block with respect to said stop position to expose successive faces and shifting of the block to the other stop positions;

mounting and retaining means adapted to mount the retainer to the fixed equipment;

indicia means for indicating the longitudinal position of the stop block with respect to the retainer and the position of the exposed face of the stop block so that shifting of the stop block between stop positions and rotation of the stop block provides a variety of indicated longitudinal adjustments for the positioning of the material engaging face of the stop block and accordingly determining the position of the stock material with respect to the fixed equipment.

3. A gauging assembly adapted for use in positioning stock material with respect to fixed equipment comprising:

an elongated retainer having a predetermined arrangement of stop positions thereon;

an elongated holder having means thereon for slidably coupling the holder to the retainer and permitting reciprocal relative longitudinal movement therebetween;

at least one stop block having a plurality of material engaging faces and being positionable to expose each face in sequence for engagement with stock material;

a connector for removably positioning the stop block at a desired stop position on the retainer to prevent the rotation of the stop block and permitting displacement laterally away from said retainer to a position permitting rotation of the stop block with respect to said stop position to expose successive faces and shifting of the block to the other stop positions;

indicia means for indicating the relative longitudinal positions of the retainer with respect to the holder, stop block with respect to the retainer, and the exposed face of the stop block;

longitudinal retaining means adapted to releasably retain the retainer and holder in relative longitudinal position and when released to permit the longitudinal shifting therebetween; and mounting means for mounting the coupled holder and retainer to the fixed equipment so that shifting of the stop block between stop positions, relative movement of the retainer with respect to the holder and rotation of the stop block provide a variety of longitudinal adjustments for positioning of a material engaging face of the stop block and accordingly determining the position of the stock material with respect to the fixed equipment.

4. The invention in accordance with claim 3 wherein the retainer is an elongated member with a row of stop holes in its upper surface for removable receipt of the connector therein said holder having, a longitudinal groove formed by space side walls with the holes located between the side walls, the connector being a tubular member with a reduced diameter lower portion and a polygonal upper portion, the stop block being substantially disc-shaped and having a polygonal circumferential configuration to form a plurality of faces about the circumference of the stop block, a polygonal aperture in the central portion of the stop block to receive part of the upper portion of the connector therein, mating surfaces on the connector and the stop block preventing relative rotation therebetween, the remainder of the regular polygonal upper portion of the connector extending beyond the opening in the stop block so that when the lower portion of the connector is positioned in a hole in the retainer the stop block will be positioned on the retainer with the faces on its outer circumferential surface pointed in the desired direction and the remainder of the upper portion of the polygonal connector engaging with the side walls forming the groove and preventing relative rotation of the connector and stop block with respect to the retainer, and the connector and stop block being removable from the retainer and rotatable to reorient the faces on the outer circumference of the stop block and to position the lower portion of the polygonal connector in another one of the row of holes along the length of the retainer thereby providing for adjustment of the gauging assembly.

5. The invention in accordance with claim 4 wherein the indicia means on the retainer includes indicia corresponding to the location of the row of holes in the retainer and accordingly providing indicating means for the longitudinal position of the stop block and connector with respect to the retainer, and the stop block being provided with indicia indicating the dimensional relationship between the faces on the outer circumference of the stop block and the central axis of the stop block thereby facilitating reorientation of the stop block so that face of desired dimension is in position for receipt of the stock material in engagement therewith.

6. The invention in accordance with claim 5 wherein the holder has indicia thereon in position for alignment with corresponding indicia on the retainer to indicate the relative longitudinal position of the retainer on the holder and accordingly facilitating adjustment of the assembly for receipt of the stock material in engagement therewith.

7. The invention in accordance with claim 6 wherein the assembly is mounted to the fixed equipment by means clamping the holder to the fixed equipment.

8. The invention in accordance with claim 4 wherein the holder is an elongated member with means for engagement with the fixed equipment and having a longitudinal channel in its upper surface for receipt of a portion of the retainer therein in longitudinal sliding relationship with respect thereto, a row of apertures in the holder in alignment with the channel therein and in position for lateral alignment with the holes in the retainer in a predetermined longitudinally offset arrangement, the longitudinal retaining means being a fastener assembly including a bolt being removalby insertable through aligned holes in the retainer and the holder and retained in position by a removable nut to hold the relative longitudinal relationship between the gauge block retainer and the holder, and removal of the fastener assembly will permit slidable movement in the longitudinal direction between the retainer and the holder until a different set of holes in the retainer and holder are in alignment indicating a new longitudinal position whereupon reassembly of the fastener assembly will hold the retainer and holder in the new fixed longitudinal position.

9. The invention in accordance with claim 4 wherein the upper portion of the connector has an octagonal outer circumferential surface, the central opening in the stop block being square in configuration, and the outer circumferential surface of the stop block being octagonal in configuration to form eight faces with each face being a different distance from the axial center of the stop block.

10. The invention in accordance with claim 9 wherein the connector is affixed to the stop block by means of a set screw threadadly engaged with aligned apertures in the connector and stop block.

11. The invention in accordance with claim 3 wherein the connector has a square outer configuration and the outer circumferential surface of the stop block has a corresponding square configuration, the central opening in the stop block being square-shaped and adapted to receive the square connector therein so the stop block and connector are rotatable together, the elongated retainer having a narrow lower portion extending along the length of the retainer, said narrow lower portion being slidably coupled to said holder, the upper surface of the retainer having a plurality of spaced recesses in longitudinal alignment, a plurality of holes in the retainer with each hole aligned with a recess in the upper surface of the retainer so that when the connector is inserted into a recess and aligned hole, the portion of the connector extending below the stop block will engage with the walls forming the recess and the hole in the retainer thereby preventing rotation of the coupled stop block and connector with respect to the remainder of the assembly, the stop block and connector being removable from a recess and aligned hole and insertable into another recess and aligned hole thereby facilitating longitudinal adjustment of the stop block with respect to the retainer without the necessity for removing the retaining means.

12. The invention in accordance with claim 11 wherein there is more than one interchangeable stop block having a connector mounted thereon with each stop block being provided with faces which are of different dimensional distances from the axial center of each stop block thereby facilitating a multiplicity of adjustments by permitting rotation of each stop block to reorientate the faces thereof and interchangeability of each stop block.

13. The invention in accordance with claim 11 wherein the connector and stop block are interconnected by means of a set screw passed through aligned threaded openings therein and threadedly interengaged therewith.

* * * * *